United States Patent
Cho (10) Patent No.: US 10,812,904 B2
(45) Date of Patent: Oct. 20, 2020

(54) ACOUSTIC EQUALIZATION METHOD, ROBOT AND AI SERVER IMPLEMENTING THE SAME

(71) Applicant: LG ELECTRONICS INC., Seoul (KR)

(72) Inventor: Young Pill Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/557,735

(22) Filed: Aug. 30, 2019

(65) Prior Publication Data

US 2019/0387317 A1 Dec. 19, 2019

(30) Foreign Application Priority Data

Jun. 14, 2019 (KR) .................. 10-2019-0071008

(51) Int. Cl.
| | |
|---|---|
| *H03G 5/00* | (2006.01) |
| *H04R 9/08* | (2006.01) |
| *H04R 1/00* | (2006.01) |
| *H04R 3/04* | (2006.01) |
| *G06N 3/08* | (2006.01) |
| *G06N 20/20* | (2019.01) |

(52) U.S. Cl.
CPC ............... *H04R 3/04* (2013.01); *G06N 3/08* (2013.01); *G06N 20/20* (2019.01)

(58) Field of Classification Search
CPC ...... G06N 20/20; G06N 3/08; H04R 2499/11; H04R 3/04
USPC ............................ 381/92, 98, 155, 356, 387
See application file for complete search history.

(56) References Cited

U.S. PATENT DOCUMENTS

| | | | | |
|---|---|---|---|---|
| 8,743,143 | B2* | 6/2014 | Choi ................ | B60K 35/00 345/619 |
| 9,437,157 | B2* | 9/2016 | Choi ................ | B60K 35/00 |
| 10,338,883 | B2* | 7/2019 | Risberg ............ | H04R 3/002 |
| 10,453,337 | B2* | 10/2019 | Anastassov ....... | G08G 1/0141 |
| 2006/0074820 | A1* | 4/2006 | Seger ............... | G06N 3/02 706/11 |
| 2011/0075851 | A1* | 3/2011 | LeBoeuf ........... | G10L 25/51 381/56 |
| 2012/0232697 | A1 | 9/2012 | Lee et al. | |

(Continued)

FOREIGN PATENT DOCUMENTS

KR  1020110054472  5/2011

OTHER PUBLICATIONS

Korean Intellectual Property Office Application No. 10-2019-0071008, Office Action dated Jan. 31, 2020, 6 pages.

*Primary Examiner* — Khai N. Nguyen
(74) *Attorney, Agent, or Firm* — Lee, Hong, Degerman, Kang & Waimey PC (57) ABSTRACT

A acoustic equalization method, and a robot and an AI server implementing the same are disclosed. The robot inputs space information with respect to a certain space and location information of a user to an artificial neutral network-based algorithm model to calculate an equalization value with respect to the certain space. Here, the space information is calculated based on at least one of a first acoustic signal output and received at a first point in the space, an image acquired through a camera, and distance information related to a space sensed through a sensing unit.

12 Claims, 8 Drawing Sheets

(56) References Cited

U.S. PATENT DOCUMENTS

| | | | |
|---|---|---|---|
| 2012/0242687 A1* | 9/2012 | Choi | B60K 35/00 |
| | | | 345/629 |
| 2014/0095161 A1* | 4/2014 | Waite | G10L 17/02 |
| | | | 704/246 |
| 2014/0119581 A1* | 5/2014 | Tsingos | H04S 5/00 |
| | | | 381/300 |
| 2014/0225927 A1* | 8/2014 | Choi | B60K 35/00 |
| | | | 345/634 |
| 2015/0039541 A1* | 2/2015 | Kapur | G06N 20/00 |
| | | | 706/12 |
| 2015/0155006 A1* | 6/2015 | Chou | H04N 9/802 |
| | | | 386/230 |
| 2015/0304772 A1* | 10/2015 | Risberg | H04R 3/007 |
| | | | 381/55 |
| 2016/0149547 A1* | 5/2016 | Rider | H03G 3/04 |
| | | | 381/57 |
| 2017/0032246 A1* | 2/2017 | Knittel | G06N 3/084 |
| 2018/0136899 A1* | 5/2018 | Risberg | G06F 3/165 |
| 2018/0155302 A1 | 6/2018 | Nirogi et al. | |
| 2018/0174051 A1* | 6/2018 | Knittel | G06N 3/04 |
| 2019/0103848 A1 | 4/2019 | Shaya et al. | |
| 2019/0129687 A1* | 5/2019 | Risberg | G06F 3/165 |
| 2019/0163436 A1* | 5/2019 | Ahn | H04L 67/2823 |
| 2019/0346836 A1* | 11/2019 | Ando | G06K 9/6264 |
| 2019/0371287 A1* | 12/2019 | Pezeshkian | G10H 3/186 |
| 2019/0387317 A1* | 12/2019 | Cho | G06N 20/20 |

\* cited by examiner

ACOUSTIC EQUALIZATION METHOD, ROBOT AND AI SERVER IMPLEMENTING THE SAME

CROSS-REFERENCE TO RELATED APPLICATION

Pursuant to 35 U.S.C. § 119(a), this application claims the benefit of earlier filing date and right of priority to Korean Patent Application 10-2019-0071008, filed on Jun. 14, 2019, the contents of which are hereby incorporated by reference herein in its entirety.

FIELD

The present invention relates to a method of equalizing acoustic in a certain space, a robot and an AI server implementing the same.

BACKGROUND

A user listens to music or watches a moving picture containing acoustic signals in a certain space. The acoustic signals output from an electronic device are directly or indirectly transmitted to a user through reflection by the ceiling, floor or wall of the certain space or by an object placed in the certain space.

On the other hand, a user can freely move instead of being stationary at a certain location in the certain space. Furthermore, if the electronic device is a movable robot, the location of the robot outputting a acoustic signal can also be changed Therefore, an equalization process of the electronic device with respect to a certain space is performed in order to achieve optimal transmission of acoustic signals to a user at a specific location in the certain space.

Although there are various equalization methods in the art, a conventional equalization method fails to reflect a user location and an output location of acoustic signals in a certain space and characteristics of the space. As a result, conventional techniques have a problem of transmission of unsatisfactory acoustic signals to a user.

SUMMARY

It is an aspect of the present invention to provide a method of equalizing acoustic in a certain space, which allows a user to receive an optimal acoustic signal in a certain space, a robot and an AI server implementing the same.

The above and other aspects and advantages of the present invention will become apparent from the detailed description of the following embodiments in conjunction with the accompanying drawings. In addition, it will be readily understood that the aspects and advantages of the present invention can be realized by features set forth in the appended claims or combinations thereof.

Embodiments of the present invention provide a method of equalizing acoustic in a certain space, a robot and an AI server implementing the same, in which space information on a certain space and user location information are input to an artificial neutral network-based algorithm model to calculate an equalization value with respect to the certain space.

In accordance with one aspect of the present invention, a robot includes: a speaker outputting a first acoustic signal for equalizing acoustic at a first point in a space; a microphone receiving the first acoustic signal reflected in the space at the first point; a camera acquiring an image of the space at the first point; a sensing unit sensing distance information related to the space at the first point; an information calculator searching space information and a user in the space based on at least one of the acquired first acoustic signal, the acquired image and the sensed distance information, and calculating location information of the user when the user is searched; and an equalizer calculating an equalizing value for the space by inputting at least one of the space information and the location information of the user to a pre-trained artificial neutral network-based algorithm model.

In accordance with another aspect of the present invention, an AI server includes: a communication unit receiving data transmitted from a robot, the data including at least one of space information with respect to a space and location information of a user in the space; and a processor inputting the data to a pre-trained artificial neutral network-based algorithm model to calculate an equalization value for the space, wherein the communication unit transmits the calculated equalization value to the robot, and the space information includes at least one of a size of the space, a shape of the space, location information of an object placed in the space, and location information of the first point.

In accordance with a further aspect of the present invention, an equalization method using a robot includes: outputting, by a speaker, a first acoustic signal for equalizing acoustic at a first point in a space; receiving, by a microphone, the first acoustic signal reflected in the space at the first point; acquiring, by a camera, an image of the pace at the first point; sensing, by a sensing unit, distance information related to the space at the first point; searching, by an information calculator, space information and a user in the space based on at least one of the acquired first acoustic signal, the acquired image and the sensed distance information, and calculating location information of the user when the user is searched; and inputting, by an equalizer, at least one of the space information and the location information of the user to a pre-trained artificial neutral network-based algorithm model to calculate an equalization value for the space.

According to embodiments of the present invention, a user can receive optimal acoustic signals in a certain space.

In particular, according to the embodiments of the present invention, an artificial neutral network is used, thereby providing an advantage of allowing a user to listen to optimal acoustic signals, irrespective of a space in which the user listens to the acoustic signal and a location of the user in the space.

It should be understood that the present invention is not limited to the effects described above and various other effects of the present invention can be easily conceived from the features of the present invention by those skilled in the art.

DETAILED DESCRIPTION

Hereinafter, embodiments of the present invention will be described with reference to the accompanying drawings such that the present invention can be easily implemented by those skilled in the art. It should be understood that the present invention may be embodied in different ways and is not limited to the following embodiments.

In the drawings, portions irrelevant to the description will be omitted for clarity. Like components will be denoted by like reference numerals throughout the specification. Further, some embodiments of the present invention will be described in detail with reference to the exemplary drawings. Here, like reference numerals are used to denote like elements even when the elements are shown in different drawings. Description of known functions and constructions which may unnecessarily obscure the subject matter of the present invention will be omitted.

It will be understood that, although the terms "first", "second", "A", "B", "(a)", "(b)", etc. may be used herein to describe various elements, components, regions, layers and/or sections, the nature, order, sequence, or number of these elements, components, regions, layers and/or sections should not be limited by these terms. These terms are only used to distinguish one element, component, region, layer or section from another element, component, region, layer or section. In addition, when an element or component is referred to as being "on," "connected to," or "coupled to" another element or component, it may be directly on, connected to, or coupled to the other element or component or intervening elements or components may be present.

It will be understood that, although components may be individually described in each embodiment of the present invention for convenience of description, these components may be implemented as one device or module, or one component may be commonly implemented in plural devices or modules.

Herein, the term "robot" may mean a machine adapted to automatically process an ordered task or operate with inherent ability. In particular, a robot having a function of carrying out an operation through recognition and determination of a surrounding environment can be referred to as an intelligent robot.

Robots can be classified into industrial, medical, household, and military applications depending upon purpose and field of use.

The robot includes a drive unit including an actuator or a motor to perform various physical actions, such as movement of robot joints and the like. In addition, a movable robot includes a wheel, a brake, a propeller, and the like in the drive unit to run on the ground through the drive unit or to fly in the air.

Figure 1:
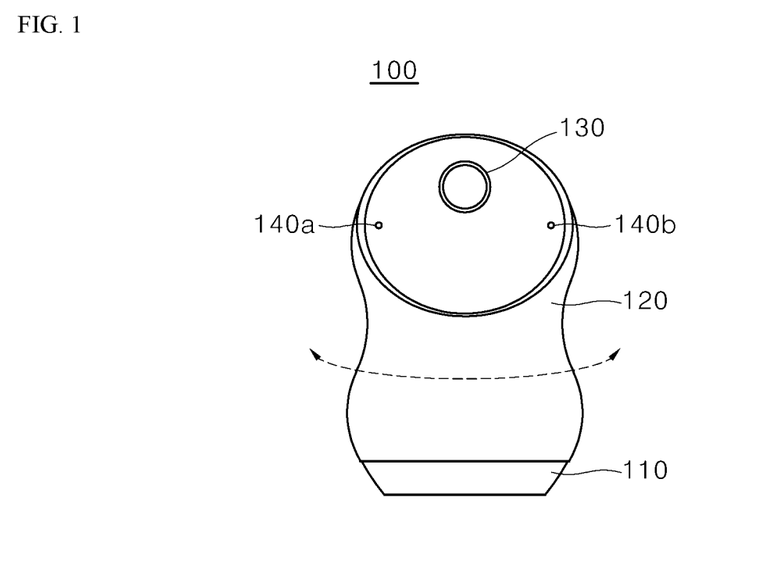
FIG. 1 is a view showing an external appearance of a robot according to one embodiment of the present invention.
Figure 2:
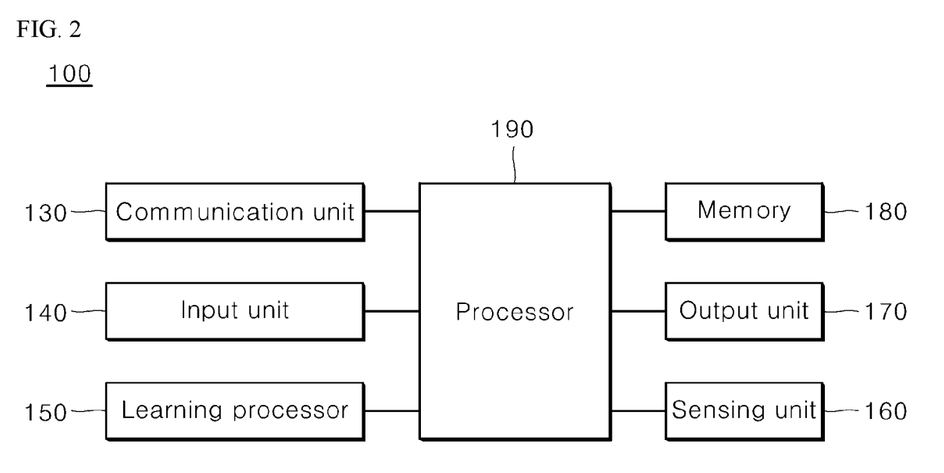
FIG. 2 is a block diagram illustrating a control relationship between main components of the robot according to the embodiment of the present invention.

FIG. 1 is a view showing an external appearance of a robot according to one embodiment of the present invention and FIG. 2 is a block diagram illustrating a control relationship between main components of the robot according to the embodiment of the present invention.

First, referring to FIG. 1, a robot 100 is a movable robot configured to move in a certain space and includes a first body 110 disposed at a lower portion of the robot and a second body 120 disposed at an upper side of the first body 110.

The first body 110 is disposed to be stationary. The second body 120 is disposed on the first body 110 to be rotatable in leftward and rightward directions.

A camera 141 is attached to an upper surface of the second body 120. The camera 141 is rotated together with the second body 120 upon rotation of the second body 120. By way of example, the camera 141 may include a depth camera.

In addition, a microphone 142, a speaker 171 and a sensing unit 160 are also attached to the second body 120.

The robot 100 calculates an equalization value with respect to a certain space using an artificial neutral network-based algorithm model. To this end, the robot 100 may include a communication unit 130, a learning processor 150, a memory 180, and a processor 190, which may be disposed inside the second body 120.

Next, the concept of the artificial neutral network-based algorithm model and functions of main components of the robot 100 will be described in detail.

Artificial Intelligence (AI) is a field of computer engineering and information technology that seeks to allow computers to think, learn, and develop, which can be done with human intelligence, through imitation of human intelligence.

Artificial intelligence does not exist by itself and is directly or indirectly connected with other fields of computer science. Particularly, various attempts have been made to solve problems in many fields of information technology through introduction of artificial intelligence.

Machine learning is a field of artificial intelligence that seeks to impart computers the ability to learn without explicit programming.

Specifically, machine learning is a technology that studies and establishes a system and algorithm for learning, predicting, and improving performance based on empirical data. Machine learning algorithms take the form of establishing a specific model to derive prediction or decision based on input data, instead of performing strictly defined static program instructions.

The term "machine learning" can be used interchangeably with the term "machine training". (이하, 기계 학습은 machine learning 으로 통일했습니다.) (이하, learning 은 기계 자체가 "학습" 하는 경우에 사용하고 training 은 기계 또는 신경망을 "학습" 시키는 경우에 사용했습니다.)

Many machine learning algorithms have been developed on how to classify data in machine learning. For example, there are decision tree, Bayesian network, support vector machine (SVM), and artificial neural network (ANN).

In particular, an artificial neural network is an information processing system modeled on an operating principle of biological neurons and a connection relationship between the neurons, in which a plurality of neurons corresponding to nodes or processing elements are connected in the form of a layered structure.

That is, the artificial neural network is a model used in machine learning and is a statistical training algorithm inspired by biological neural networks (particularly the brain of an animal's central nervous system) in machine learning and cognitive science.

Specifically, the artificial neural network may include a plurality of layers, each of which may include a plurality of neurons. In addition, the artificial neural network may also include synapses that connect neurons to neurons. That is, the artificial neural network may mean a whole model in which an artificial neuron forms a network through connection of synapses and has a problem solving ability by changing binding strength of a synapse through training.

The term "artificial neural network" can be used interchangeably with the term "neural network", the term "'neuron" can be used interchangeably with the term "node", and the term "synapse" can be used interchangeably with the term "edge".

The artificial neural network may be generally defined by three factors, that is, (1) a pattern of connections between neurons in different layers, (2) a training process to update weights of synapses, and (3) an activation function that produces an output value from a weighted sum of inputs received from previous layers.

The artificial neural network may include network models, such as a deep neural network (DNN), recurrent neural network (RNN), bidirectional recurrent deep neural network (BRDNN), multilayer perceptron (MLP), and convolutional neural network (CNN), without being limited thereto.

The artificial neural networks are classified into a single-layer neural network and a multilayer neural network according to the number of layers.

A general single-layer neural network consists of an input layer and an output layer.

Figure 3:
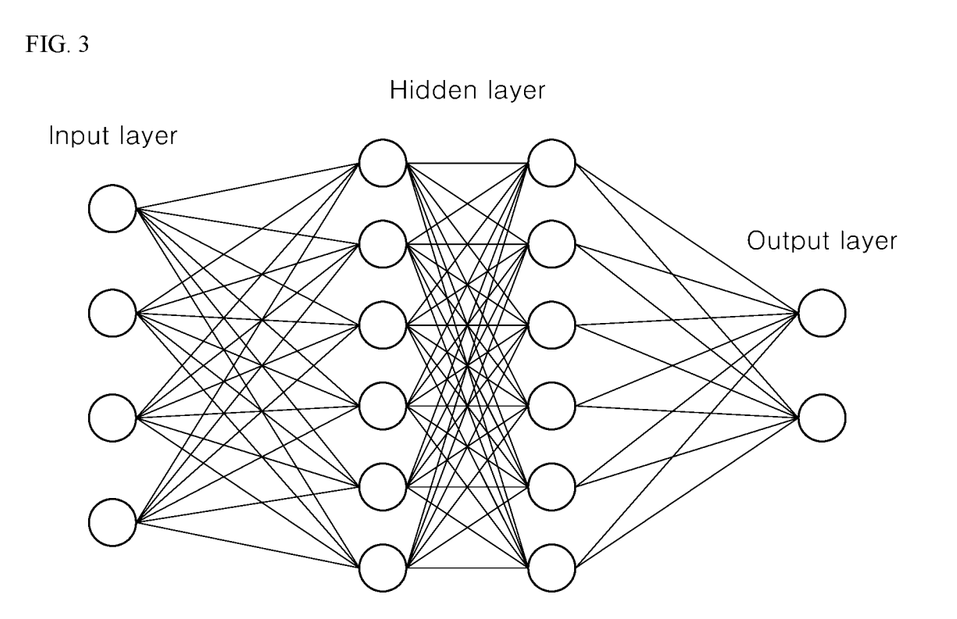
FIG. 3 is a conceptual diagram of an artificial neutral network-based algorithm model.

A multilayer neural network consists of an input layer, at least one hidden layer, and an output layer. This structure is shown in FIG. 3.

The input layer is a layer adapted to receive external data and the number of neurons in the input layer is the same as the number of input variables.

The hidden layer is located between the input layer and the output layer, receives a signal from the input layer, extracts characteristics of the signal, and transfers the extracted characteristics to the output layer.

The output layer receives a signal from the hidden layer and outputs an output value based on the received signal. An input signal between neurons is multiplied by each weight (connection strength) and then summed. If the sum is larger than a critical value of the neuron, the neuron is activated to output the output value obtained through the activation function.

On the other hand, a deep neural network including a plurality of hidden layers between the input layer and the output layer may be a representative artificial neural network that implements deep learning, which is one type of machine learning technology.

The term "deep learning" can be used interchangeably with the term "deep training".

The artificial neural network may be trained using training data. Here, learning or training means a process of determining parameters of an artificial neural network using training data in order to achieve classification, regression, or clustering of input data. Synaptic weights or bias applied to neurons are representative examples of parameters of the artificial neural network.

The artificial neural network trained by the training data may classify or group input data according to a pattern of the input data. Herein, the artificial neural network trained using the training data may be referred to as a trained model.

Next, a learning method of the artificial neural network will be described.

The learning methods of the artificial neural network can be broadly classified into supervised learning, unsupervised learning, semi-supervised learning, and reinforcement learning.

Supervised learning is a method of machine learning to derive a function from training data. Among inferred functions, a process of outputting successive values is referred to as regression, and a process of predicting and outputting a class of an input vector is referred to as classification. In other words, in supervised learning, the artificial neural network is trained with labeled training data. Here, the term "label" means a correct answer (or result value) to be inferred by the artificial neural network when the training data is input to the artificial neural network.

Unsupervised learning is a kind of machine learning, in which no label is provided to training data. Specifically, unsupervised learning is a training method by which the artificial neural network is trained so as to find and classify patterns from the training data, rather than an association relationship between the training data and labels corresponding to the training data.

Semi-supervised learning is a kind of machine learning and may mean a training method using both labeled training data and unlabeled training data. In one of techniques of semi-instruction learning, labels of the unlabeled training data are inferred and training is performed using the inferred labels. This technique is advantageously used in the case where labeling costs are high.

Reinforcement learning is a theory that the artificial neural network can find the best way in an empirical manner without data if an agent is permitted to determine what action the agent should do at any given moment.

Referring to FIG. 2, functions of each component will be described hereinafter.

The communication unit 130 communicates with external electronic devices, such as an external AI server, an audio output device, and the like. By way of example, the communication unit 130 may transmit and receive sensor information, user input, training models, control signals, and the like with respect to external devices.

The communication unit 130 may use communication techniques, such as global system for mobile communication (GSM), code division multiple access (CDMA), long term evolution (LTE), 5G, wireless LAN (WLAN), Wi-Fi, Bluetooth™, radio frequency identification (RFID), infrared data association (IrDA), ZigBee, near field communication (NFC), and the like.

The input unit 140 includes the camera 141 and the microphone 142, and may acquire various kinds of data.

Image data or acoustic data collected through the input unit 140 may be analyzed and processed by a user control command. The input unit 140 may acquire input data to be used when acquiring an output using training data for training an algorithm model and the trained algorithm model.

The input unit 140 may acquire unprocessed input data. In this case, the processor 190 or the learning processor 150 may preprocess acquired data to generate training data or preprocessed input data that can be input in training of the algorithm model. In this case, preprocessing of the input data may mean extracting input feature points from the input data.

The camera 141 may acquire image information and the acquired image information may be stored in the memory 180.

The microphone 142 processes an external acoustic signal into electrical voice data. The processed voice data may be used in various ways depending upon the function (or application) executed in the robot 100.

The learning processor 150 trains an artificial neutral network-based algorithm model using training data.

Specifically, the learning processor 150 may determine optimized model parameters of the artificial neural network by repeatedly training the artificial neural network using the aforementioned various training techniques.

Herein, an artificial neural network, parameters of which are determined by training using the training data, is referred to as a trained algorithm model. The trained algorithm model may be used to infer result values for new input data rather than training data and the inferred values may be used as a basis for determining a certain action to perform.

The term "learning processor" may be used interchangeably with the term "training unit".

The sensing unit 160 may acquire at least one of internal information of the robot 100, surrounding environment information of the robot 100, and user information through various sensors.

The sensors included in the sensing unit 160 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, a light sensor, light detection and ranging (LiDAR), a radar, and the like.

The output unit 170 generates visual, auditory or tactile output and may include the speaker 171.

The memory 180 may be a volatile and/or non-volatile memory. The memory 180 and may store instructions or data related to control of at least one of other components of the robot 100 and may store a plurality of application programs or applications to be driven in the robot 100.

In particular, the memory 180 may store instructions or data for operation of the learning processor 150. The memory 180 may store the algorithm model trained by the learning processor 150 or the algorithm model trained by the AI server. The memory 180 may store input data obtained from the input unit 140, training data used to train the algorithm model, training history of the algorithm model, and the like. The input data stored in the memory 180 may include unprocessed input data as well as the processed data suitable for training of the algorithm model.

The processor 190 may include at least one of a central processing unit, an application processor, and a communication processor.

The processor 190 controls the overall operation of the robot 100, processes input or output signals, data, information, and the like, or drives the application programs stored in the memory 180.

The processor 190 may determine at least one executable operation of the robot 100 based on information determined or generated using a data analysis algorithm or a machine learning algorithm.

To this end, the processor 180 may request, search, receive, or utilize data from the learning processor 150 or the memory 180 and may control components of the robot 100 to execute a predicted operation or an operation determined to be desirable, among the at least one executable operation.

Here, the processor 190 may generate a control signal for controlling a corresponding external device and may transmit the control signal to the external device when there is a need for connection to the external device to perform the determined operation.

The processor 190 may collect history information including operation contents of the robot 100 and user feedback on the operations, store the history information in the memory 180 or the learning processor 150, or transmit the history information to an external device, such as an AI server. The collected history information may be used to update the training model.

The processor 190 may include an information calculator 191 and an equalizer 192. Here, each of the information calculator 191 and the equalizer 192 may be a logically separated module within the processor 190. On the other hand, the module disclosed herein may mean a functional and structural combination of software for implementing the technical idea of the present invention.

The information calculator 191 calculates information for performing acoustic equalization. At this time, this information may include space information of a certain space and location information of a user in the certain space.

The equalizer 192 calculates an equalization value with respect to the certain space by inputting the information calculated by the information calculator 191 into the trained artificial neutral network-based algorithm model. Training may be performed in the aforementioned learning processor 150, i.e. the training unit.

Next, an embodiment of a method for acoustic equalization with respect to a certain space using an artificial neutral network-based algorithm model will be described with reference to FIG. 4 to FIG. 7.

Figure 4:
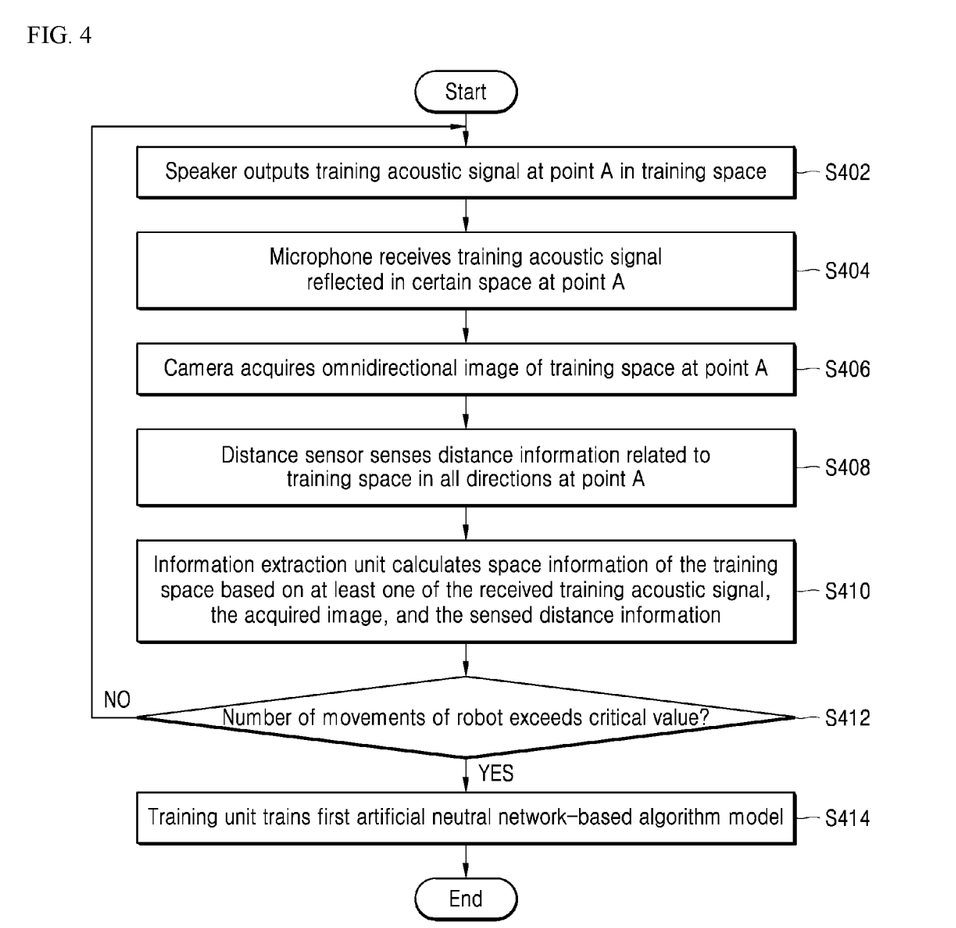
FIG. 4 is a flowchart of a process of training an artificial neutral network-based algorithm model according to one embodiment of the present invention.

FIG. 4 is a flowchart of a process of training an artificial neutral network-based algorithm model according to one embodiment of the present invention.

Here, the process of training the artificial neutral network-based algorithm model may be performed through the robot 100, which may be disposed and movable in a training space to generate training data.

Next, a process performed in each step will be described.

Figure 5:
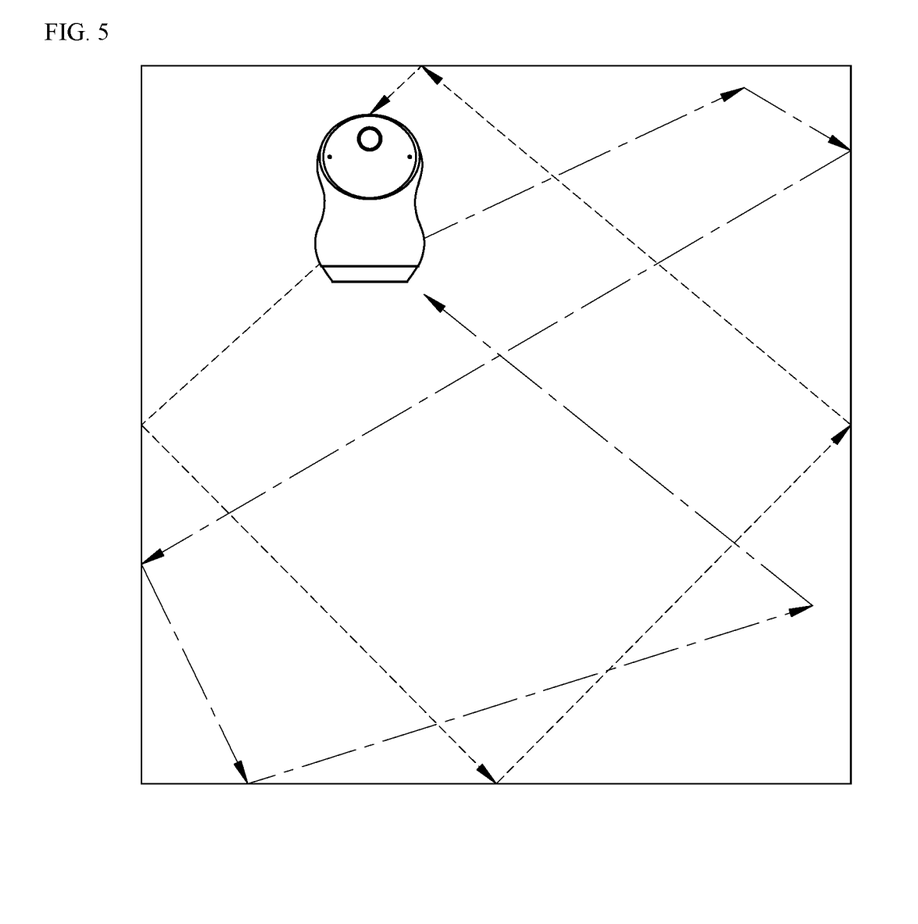
FIG. 5 is a conceptual diagram of a robot operated to output a acoustic signal and to receive an output acoustic signal according to the present invention.

In step S402, the speaker 171 outputs a training acoustic signal at a point A in a training space and, in step S404, the microphone 142 receives the training acoustic signal reflected in the training space at the point A. This process is shown in FIG. 5. The received training acoustic signal is stored in the memory 180. On the other hand, the reflection includes reflection by an object placed in the training space.

According to one embodiment, the training acoustic signal may be a frequency sweep signal including brown noise.

In step S406, the camera 141 acquires an omnidirectional image of the training space at the point A and, in step S408, a distance sensor (IR sensor, ultrasonic sensor, rider, etc.) in the sensor unit 160 senses distance information related to the training space in all directions at the point A.

That is, the robot 100 rotates in leftward and rightward directions, and the camera 141 and the distance sensor rotate through rotation of the robot 100, whereby the omnidirectional image and the distance information can be obtained.

The acquired image and the sensed distance information may also be stored in the memory 180. Step S406 and step S408 may be performed simultaneously with step S402 and step S404 or may be performed at a time point adjacent thereto.

Thereafter, in step S410, the information extraction unit 191 calculates space information of the training space based on at least one of the received training acoustic signal, the acquired image, and the sensed distance information. Hereinafter, for convenience of description, the space information of the training space is referred to as "training space information". The calculated training space information may be included in the training data.

Here, the space information may include at least one of the size of the training space, the form (shape) of the training space, location information of the object placed in the training space, and location information of the robot 100 (i.e., the location information of the point A).

That is, the information extraction unit 191 may calculate the training space information using an output time and output angle of the training acoustic information output from the speaker 171 and a reception time and reception angle of the training acoustic signal received from the microphone 142. In addition, the information extraction unit 191 may calculate the training space information using the distance information extracted from the acquired image and the distance information sensed through the sensing unit 160. Further, the information extraction unit 191 may calculate the training space information using both the space information based on the training acoustic signal and the space information based on the image and the sensing process.

The robot 100 moves to pass through a plurality of points in the training space. In step S412, it is determined whether the number of movements of the robot 100 exceeds a preset critical number.

If the number of movements is less than or equal to the critical number, steps S402 to S410 are performed. That is, steps S402 to S410 are performed at each of the plurality of points in the training space, whereby plural training space information are calculated.

If the number of movements exceeds the critical number, the training unit 150 trains a first algorithm model based on the artificial neural network in step S414.

According to one embodiment of the invention, the first algorithm model is an algorithm model in which learning is performed by the plurality of training space information, and is used when a user is not present in the training space upon calculation of an equalization value with respect to the training space as described below.

Specifically, the first algorithm model includes an input layer configured as an input node, an output layer configured as an output node, and at least one hidden layer disposed between the input layer and the output layer and configured as a hidden node. At this time, the training space information is input to the input layer, a training equalization value corresponding to a training result is output to the output layer, and the weight of the edge connecting nodes and the bias of the nodes are updated through training.

Figure 6:
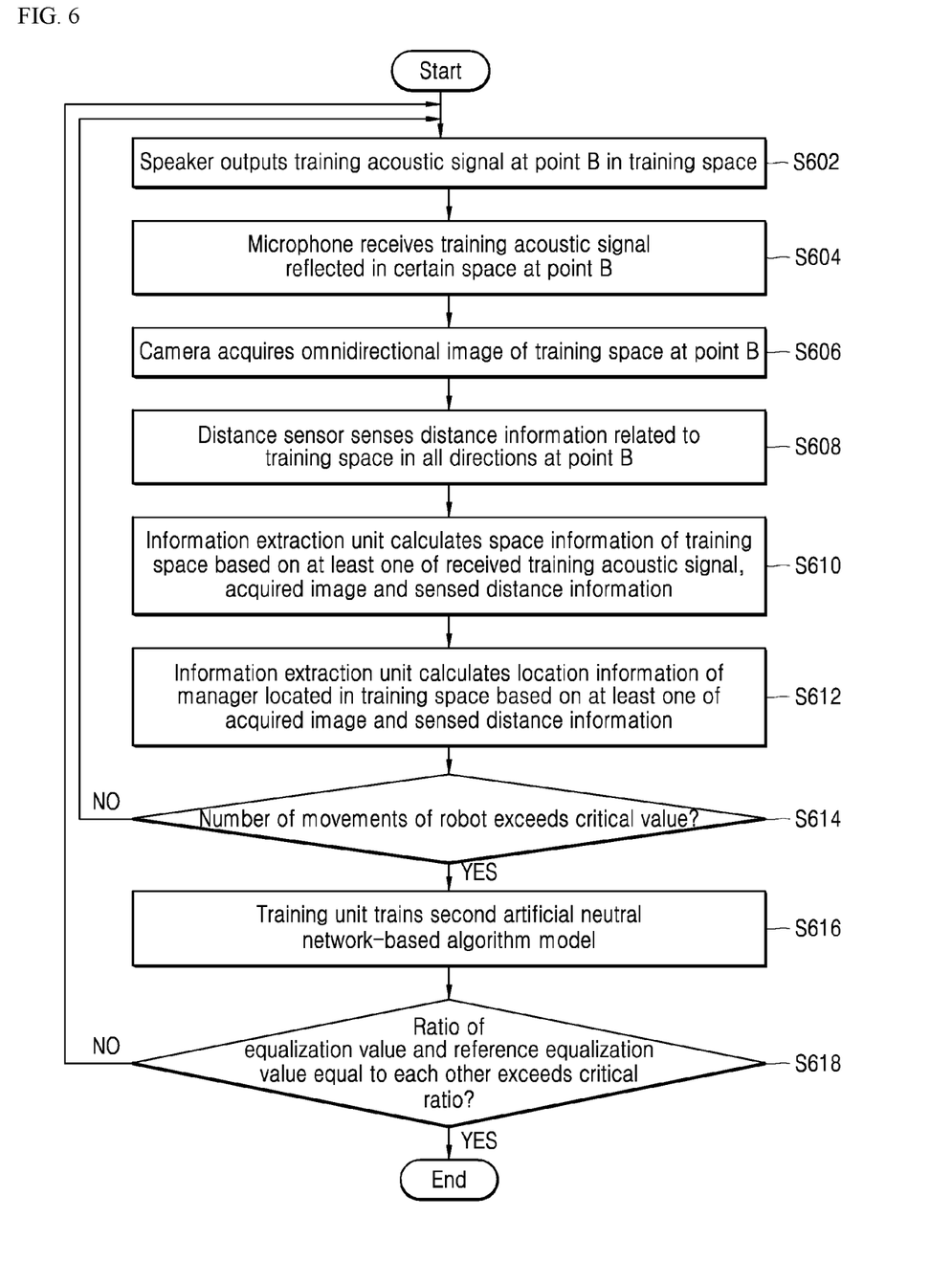
FIG. 6 is a flowchart of a process of training an artificial neutral network-based algorithm model according to another embodiment of the present invention.

FIG. 6 is a flowchart of a process of training an artificial neutral network-based algorithm model according to another embodiment of the present invention. In FIG. 6, the process of training the artificial neutral network-based algorithm model may also be performed through the robot 100 that is movable in a training space. Hereinafter, a process performed in each step will be described.

In step S602, the speaker 171 outputs a training acoustic signal at a point B in a training space and, in step S604, the microphone 142 receives the training acoustic signal reflected in the training space at the point B.

In step S606, the camera 141 acquires an omnidirectional image of the training space at the point B and, in step S608, a distance sensor in the sensor unit 160 senses distance information related to the training space in all directions at the point B.

In step S610, the information extraction unit 191 calculates space information of the training space based on at least one of the received training acoustic signal, the acquired image, and the sensed distance information.

Steps S602 to S610 are similar to steps S402 to S410 described above and thus a detailed description thereof is omitted.

Then, in step S612, the information extraction unit 191 calculates location information of a manager in the training space based on at least one of the obtained image and the sensed distance information. Hereinafter, for convenience of description, the location information of the manager is referred to as "training location information of the manager". On the other hand, the manager may have a separate microphone, which receives a training acoustic signal output from the speaker 171 of the robot 100 at the point B.

In step S612, it is determined whether the number of movements of the robot 100 exceeds a preset critical number. As the robot 100 moves, the manager may also move to other points.

If the number of movements is less than or equal to the critical number, step S602 to step S612 are performed. That is, steps S602 to S612 are performed at each of a plurality of points in the training space, whereby plural training space information are calculated.

If the number of movements exceeds the critical number, the training unit 150 trains an artificial neutral network-based algorithm model in step S614.

According to one embodiment of the invention, the algorithm model may be a second algorithm model. The second algorithm model is an algorithm model in which training is performed by the plurality of training space information and a plurality of training location information of the manager, and is used when a user is present in the training space upon calculation of an equalization value with respect to the training space as described below.

Specifically, the second algorithm model includes an input layer configured as an input node, an output layer configured as an output node, and at least one hidden layer disposed between the input layer and the output layer and configured as a hidden node. Here, the training space information and the training location information of the manager corresponding thereto are input to the input layer, a training equalization value corresponding to a training result is output from the output layer, and the weight of the edge connecting nodes through training and the bias of the nodes are updated.

In step S618, the training unit 150 compares a plurality of training equalization values with a plurality of preset reference equalization values on one-to-one basis to determine whether the ratio of the training equalization values and the reference equalization values equal to each other within an error range to the total number of equalization values for comparison exceeds a preset critical ratio.

Here, the reference equalization value means an equalization value when a training acoustic signal output at a specific point in the training space is optimally delivered to a manager located at another point in the training space, and may be set by a acoustic equalization expert based on the training acoustic signal of the robot 100 received by the microphone of the manager.

That is, when the robot 100 outputs a training acoustic signal at a specific point, the microphone of the manager receives the training acoustic signal and the manager or the equalizing expert analyzes the received training acoustic signal to set a reference equalization value for the specific point. Therefore, for each of the plurality of points, one training equalization value according to training is calculated and a reference equalization value is set by the manager or the equalization expert. Thus, one training equalization value and one reference equalization value correspond to each other on one-to-one basis.

In addition, the term "ratio" means "the number of training equalization values and reference equalization values equal to each other within an error range/the total number of equalization values for comparison".

If it is determined through one-to-one comparison that the ratio of the training equalization values and the reference equalization values equal to each other within an error range to the total number of equalization values for comparison exceeds a preset critical ratio, the training unit 150 may terminate training of the second algorithm model. Conversely, if it is determined through one-to-one comparison that the ratio is less than the critical ratio, steps S602 to S618 are performed to continue training.

In other words, in the process of training the algorithm model according to the other embodiment of the invention, the second algorithm model is trained using both the plurality of training space information and the plurality of training location information of the manager. Then, a plurality of reference equalization values is used to ascertain that training of the second algorithm model is performed accurately. Training of the second algorithm model is terminated when the training equalization value calculated in training is almost similar to the reference equalization value, and continuous training is performed when the training equalization value calculated in training is different from the reference equalization value.

Figure 7:
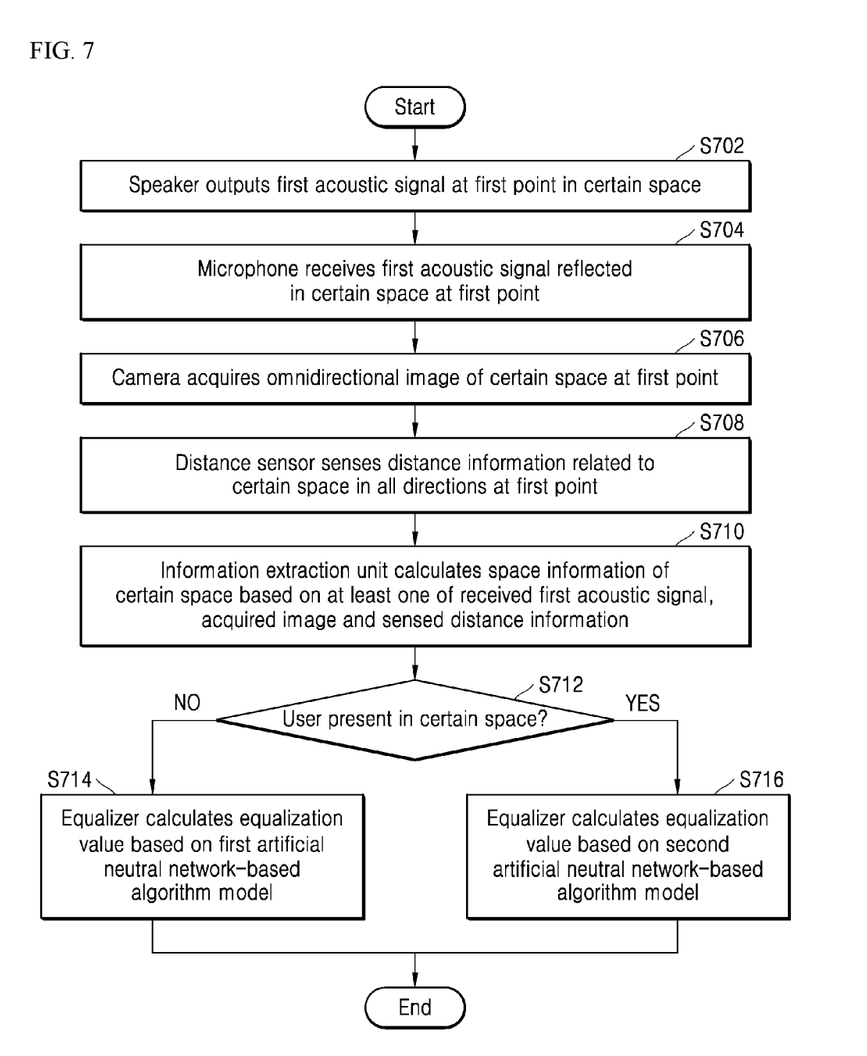
FIG. 7 is a flowchart of a process of calculating an equalization value of a acoustic in a certain space using the artificial neutral network-based algorithm model according to the one embodiment of the present invention.

FIG. 7 is a flowchart of a process of calculating an equalization value of a acoustic in a certain space using an artificial neutral network-based algorithm model according to one embodiment of the present invention. Here, it is assumed that the robot 100 is moved to a new location in a certain space. Hereinafter, a process performed in each step will be described.

In step S702, the speaker 171 outputs a first acoustic signal at a first point in a certain space and, in step S704, the microphone 142 receives the first acoustic signal reflected in the certain space at the first point. Here, the reflection includes reflection by an object placed in the certain space.

According to one embodiment of the invention, the first acoustic signal may be a signal for equalization of the acoustic and may include, for example, a frequency sweep signal including brown noise.

At the same time, or at an adjacent time point, in step S706, the camera 141 acquires an omnidirectional image of the certain space at the first point and, in step S708, a distance sensor (IR sensor, ultrasonic sensor, rider, etc.) in the sensor unit 160 senses distance information related to the certain space in all directions at the first point. In this case, it is possible to achieve acquisition of the omnidirectional image and sensing of the distance information through rotation of the robot 100.

Thereafter, in step S710, the information extraction unit 191 calculates space information of the certain space based on the received first acoustic signal, the acquired image and the sensed distance information.

Here, the space information may include at least one of the size of the training space, the form (shape) of the training space, location information of the object placed in the training space, and location information of the robot 100 (i.e., the location information of the first point).

That is, the information extraction unit 191 may calculate the space information using an output time and output angle of the first acoustic information output from the speaker 171 and a reception time and reception angle of the first acoustic signal received from the microphone 142. In addition, the information extraction unit 191 may calculate the space information using the distance information extracted from the acquired image and the distance information sensed through the sensing unit 160. Further, the information extraction unit 191 may calculate the space information using both the space information based on the first acoustic signal and the space information based on the image and the sensing process.

Then, in step S712, the information extraction unit 191 determines whether a user is present in the certain space based on at least one of the acquired image and the sensed distance information.

Here, the equalizer 192 calculates the equalization value for the space by inputting at least one of the space information and user location information to pre-trained artificial neutral network-based algorithm models.

That is, if a user is not present in the certain space, in step S714, the equalizer 192 calculates the equalization value for the space using a trained first algorithm model among artificial neutral network-based algorithm models. That is, the calculated space information is input to an input layer of the trained first algorithm model and the equalization value for the specific space is output from an output layer of the trained first algorithm model.

In addition, if the user is present in the certain space, in step S716, the equalizer 192 calculates the equalization value for the space using a trained second algorithm model among artificial neutral network-based algorithm models. That is, the calculated space information is input to an input layer of the trained second algorithm model and the equalization value for the space is output from an output layer of the trained second algorithm model.

Based on the calculated equalization value, the robot 100 outputs a second acoustic signal through the speaker 171 at the first point. Here, the second acoustic signal is a acoustic signal for entertainment of a user, such as music. As a result, the user can listen to the second acoustic signal in an optimal state output from the robot 100 at the first point.

The robot 100 may transmit the equalization value calculated through the communication unit 130 to an electronic device, which is located at the first point in a certain space and outputs a second acoustic signal. The electronic device may output the second acoustic signal based on the transmitted equalization value. This process will be described in more detail hereinafter.

The electronic device provided with the speaker is located at the first point in the certain space and the robot 100 is located at another location in the certain space instead of being located at the first point.

When a user inputs a voice command signal corresponding to the electronic device and an operation command to the robot 100, the drive unit of the robot moves the robot 100 to the first point at which the electronic device is located. The robot 100 can identify a location of the first point through the camera 141, the sensor unit 160, and the like, and can identify the location of the first point through various other methods.

The robot 100 moved to the first point performs the process of calculating the equalization value for the acoustic in the certain space, particularly the steps described with reference to FIG. 7, thereby calculating the equalization value for the acoustic.

Then, the robot 100 transmits a command for operation of the electronic device and the calculated equalization value to the electronic device via the communication unit 130, and the electronic device outputs the second acoustic signal based on the transmitted equalization value.

In other words, the method for calculating an equalization value of a acoustic in a certain space according to the present invention may calculate the equalization value using the robot 100, particularly, the artificial neutral network-based algorithm model.

In particular, although a conventional technique can transmit an optimal acoustic signal to a user in one space, the conventional technique fails to transmit an optimal acoustic signal to a user in other spaces due to difference in size and shape of the spaces. However, according to the present invention, it is possible to transmit an optimal acoustic signal to a user in all spaces based on the artificial neural network.

On the other hand, the artificial neural network-based algorithm models may be stored in an AI server instead of the robot 100. In this case, calculation of the equalization value using the content of training and the algorithm models of the robot 100 described above may be performed by the AI server.

Figure 8:
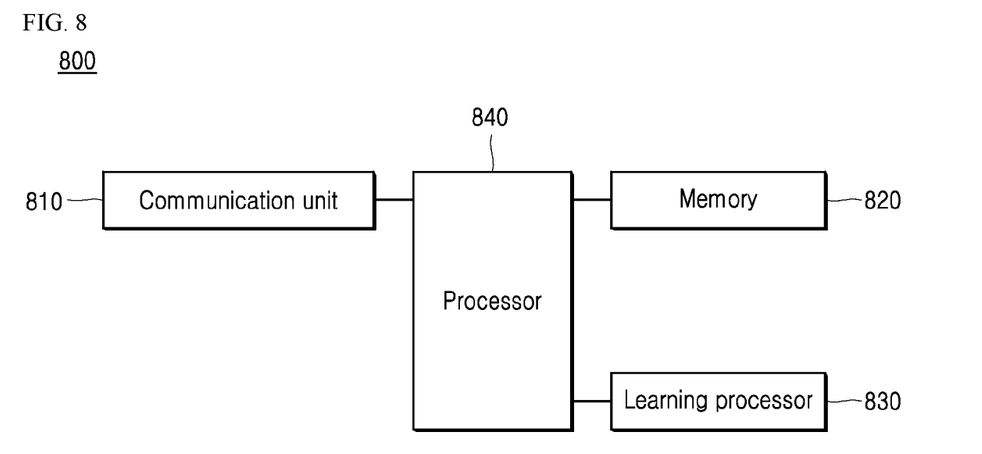
FIG. 8 is a block diagram illustrating schematic configuration of an AI server according to one embodiment of the present invention.

FIG. 8 is a block diagram illustrating schematic configuration of an AI server according to one embodiment of the present invention.

Referring to FIG. 8, an AI server 800 includes a communication unit 810, a memory 820, a learning processor 830, and a processor 840.

The communication unit 810 receives data transmitted from the robot 100. Here, the transmitted data may be training data or data including at least one of space information and user location information for calculation of an equalization value.

The memory 820 stores the artificial neutral network-based algorithm models.

The learning processor 830 trains the algorithm model using training data transmitted from the robot 100.

The processor 840 calculates an equalization value of a space by inputting at least one of space information and user location information transmitted from the robot 100 to the algorithm model.

The memory 820, the learning processor 830 and the processor 840 of the AI server 800 are similar to the memory 180, the learning processor 150 and the processor 190 of the robot 100 described above, and thus a detailed description thereof is omitted.

The embodiments of the present invention may be realized in the form of program instructions which can be implemented through various computer components, and may be recorded in computer-readable storage media. The computer-readable storage media may include a program instruction, a local data file, a local data structure, and the like either alone or in combination thereof. The program instruction recorded in the computer-readable storage media may be any program instruction particularly designed and structured for the present invention or known to those skilled in the field of computer software. Examples of the computer-readable storage media include magnetic recording media such as hard disks, floppy disks and magnetic tapes, optical data storage media such as CD-ROMs or DVD-ROMs, magneto-optical media such as floptical disks, and hardware devices, such as a read-only memory (ROM), random-access memory (RAM) and flash memory, which are particularly structured to store and implement the program instruction. Examples of the program instruction include not only machine language code formatted by a compiler but also high level language code which can be executed by a computer using an interpreter. The hardware devices may be configured to be operated by one or more software modules or vice versa to perform the processes according to the present invention.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A robot comprising:
a speaker configured to output a first acoustic signal for equalizing acoustics at a first point in a space;
a microphone configured to receive the first acoustic signal reflected in the space at the first point;
a camera configured to acquire an image of the space at the first point;
a sensing unit configured to sense distance information related to the space at the first point;
an information calculator configured to search space information and a user in the space based on at least one of the received first acoustic signal, the acquired image, and the sensed distance information, and calculate location information of the user when the user is determined to be present as a result of the search; and
an equalizer configured to determine an equalizing value for the space by inputting at least one of the space information or the location information of the user to a pre-trained artificial neutral network-based algorithm model.

2. The robot according to claim 1, wherein the space information comprises at least one of a size of the space, a shape of the space, location information of an object placed in the space, or location information of the first point.

3. The robot according to claim 1, wherein a second acoustic signal is output by the speaker based on the equalization value at the first point.

4. The robot according to claim 3, further comprising:
a drive unit configured to drive the robot; and
a communication unit configured to communicate with an electronic device located at the first point,
wherein the drive unit is configured to move the robot to the first point from a point other than the first point,
wherein the communication unit is configured to transmit the equalization value to the electronic device, and
wherein the equalization value is used in output of the second acoustic signal by the electronic device.

5. The robot according to claim 1, wherein:
the pre-trained artificial neural network-based algorithm model comprises a first algorithm model to which the space information is input and a second algorithm model to which the space information and the location information of the user are input,
the equalization value is determined using the first algorithm model when the user is determined as not being present as a result of the search, and
the equalization value is determined using the second algorithm model when the user is determined to be present as a result of the search.

6. The robot according to claim 5, wherein each of the first algorithm model and the second algorithm model comprises:
an input layer configured as an input node;
an output layer configured as an output node; and at least one hidden layer disposed between the input layer and the output layer and configured as a hidden node, and wherein a weight of an edge connecting nodes and a bias of the nodes are updated through training.

7. The robot according to claim 6, wherein:

the space information is input to the input layer of the first algorithm model;

the space information and the location information of the user are input to the input layer of the second algorithm model; and the equalization value for the space is output from the output layers of the first algorithm model and the second algorithm model.

8. The robot according to claim 1, further comprising:

a training unit configured to train the pre-trained artificial neural network-based algorithm model based on training data, wherein the training data comprises at least one of a plurality of training space information with respect to a training space or a plurality of training location information of a manager in the training space corresponding to the plurality of training space information, respectively.

9. The robot according to claim 8, wherein:

the training unit is further configured to determine, based on a plurality of reference equalization values, whether training should be terminated; and each of the reference equalization values is set based on a training acoustic signal received by the microphone of the manager.

10. The robot according to claim 9, wherein:

the training unit is further configured to compare a plurality of training equalization values calculated by training with the plurality of reference equalization values on one-to-one basis; and training is terminated when a ratio of the training equalization values and the reference equalization values exceeds a preset critical ratio.

11. An AI server comprising:

a communication unit configured to receive data transmitted from a robot wherein the data comprises at least one of space information with respect to a space and location information of a user in the space; and a processor configured to determine an equalizing value for the space by inputting the data to a pre-trained artificial neutral network-based algorithm model;

wherein the communication unit transmits the equalization value to the robot, and wherein the space information comprises at least one of a size of the space, a shape of the space, location information of an object placed in the space, and location information of the robot.

12. An acoustic equalization method using a robot, comprising:

outputting, by a speaker, a first acoustic signal for equalizing acoustics at a first point in a space;

receiving, by a microphone, the first acoustic signal reflected in the space at the first point;

acquiring, by a camera, an image of the space at the first point;

sensing, by a sensing unit, distance information related to the space at the first point;

searching, by an information calculator, space information and a user in the space based on at least one of the received first acoustic signal, the acquired image, or the sensed distance information, and calculating location information of the user when the user is determined to be present as a result of the search; and determining, by an equalizer, an equalization value for the space by inputting at least one of the space information or the location information of the user to a pre-trained artificial neutral network-based algorithm model.

* * * * *